United States Patent
Mullings et al.

(10) Patent No.: US 12,469,011 B2
(45) Date of Patent: *Nov. 11, 2025

(54) METHOD AND SYSTEM FOR AUTOMATIC TASK TIME ESTIMATION AND SCHEDULING

(71) Applicant: D2L Corporation, Kitchener (CA)

(72) Inventors: Owen Mullings, Kitchener (CA); John Baker, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/368,777

(22) Filed: Sep. 15, 2023

(65) Prior Publication Data

US 2024/0005285 A1    Jan. 4, 2024

Related U.S. Application Data (63) Continuation of application No. 17/245,044, filed on Apr. 30, 2021, now Pat. No. 11,803,818, which is a continuation of application No. 15/866,911, filed on Jan. 10, 2018, now Pat. No. 11,023,865, which is a continuation of application No. 13/833,752, filed on Mar. 15, 2013, now abandoned.

(51) Int. Cl.
*G06Q 10/10* (2023.01)
*G06Q 10/1093* (2023.01)

(52) U.S. Cl.
CPC ................ *G06Q 10/1097* (2013.01)

(58) Field of Classification Search
CPC .................................................. G06Q 10/10
See application file for complete search history.

(56) References Cited

U.S. PATENT DOCUMENTS

| | | | |
|---|---|---|---|
| 5,574,798 A | 11/1996 | Greer et al. | |
| 8,005,703 B2 | 8/2011 | Chakra et al. | |
| 8,136,114 B1* | 3/2012 | Gailloux | G06Q 10/06 718/104 |
| 8,172,578 B2 | 5/2012 | Clark et al. | |
| 11,023,865 B2 | 6/2021 | Mullings et al. | |
| 11,803,818 B2 | 10/2023 | Mullings et al. | |
| 2003/0083891 A1* | 5/2003 | Lang | G06Q 10/10 705/321 |
| 2004/0002039 A1 | 1/2004 | Draper et al. | |
| 2004/0125133 A1 | 7/2004 | Pea et al. | |
| 2004/0187140 A1 | 9/2004 | Aigner et al. | |

(Continued)

FOREIGN PATENT DOCUMENTS

WO    WO-2014124448 A1 *    8/2014    ........... G06F 9/5038

OTHER PUBLICATIONS

Robert J. Vance, Ph.D., Employee Engagement and Commitment a guide to understanding, measuring and increasing engagement in your organization, SHRM Foundation's Effective Practice Guidelines, 2006. (Year: 2006).*

(Continued)

*Primary Examiner* — Kurtis Gills
(74) *Attorney, Agent, or Firm* — Amarok IP Inc.; Neil W. Henderson (57) ABSTRACT

A method and system for automatic task time estimation and scheduling comprising the steps of: (1) storing a plurality of media items; (2) defining an aggregate task; (3) storing participant data and historical time data; (4) determining a plurality of metadata attributes; and (5) determining a final time estimate.

21 Claims, 3 Drawing Sheets

(56) References Cited

U.S. PATENT DOCUMENTS

| | | |
|---|---|---|
| 2006/0129970 A1 | 6/2006 | Haas et al. |
| 2006/0254601 A1 | 11/2006 | Matsumura et al. |
| 2007/0100882 A1 | 5/2007 | Hochwarth et al. |
| 2007/0192174 A1 | 8/2007 | Bischoff |
| 2008/0005744 A1 | 1/2008 | Buco et al. |
| 2009/0063238 A1 | 3/2009 | Storzum et al. |
| 2010/0075287 A1* | 3/2010 | Dohrmann ............... G09B 5/00 434/309 |
| 2010/0223276 A1* | 9/2010 | Al-Shameri ........... G06V 20/13 707/769 |
| 2011/0071875 A1* | 3/2011 | Stenhaug ........... G06Q 10/0637 705/7.36 |
| 2011/0184771 A1* | 7/2011 | Wells ............. G06Q 10/063114 705/7.14 |
| 2011/0288900 A1 | 11/2011 | McQueen et al. |
| 2012/0033948 A1 | 2/2012 | Rodriguez et al. |
| 2012/0180055 A1* | 7/2012 | Brech ................... G06F 9/4893 718/102 |

OTHER PUBLICATIONS

Office Action dated May 7, 2020 in respect of U.S. Appl. No. 15/866,911.

Office Action dated Nov. 14, 2019 in respect of U.S. Appl. No. 15/866,911.

Vance, Employee Engagement and Commitment a guide to understanding, measuring and increasing engagement in your organization, SHRM Foundation's Effective Practice Guidelines, 2006.

Office Action dated Dec. 16, 2022 in respect of U.S. Appl. No. 17/245,044.

Office Action dated May 1, 2023 in respect of U.S. Appl. No. 17/245,044.

\* cited by examiner

FIG. 3

METHOD AND SYSTEM FOR AUTOMATIC TASK TIME ESTIMATION AND SCHEDULING

RELATED APPLICATIONS

This application is a continuation of U.S. patent application Ser. No. 17/245,044 filed on Apr. 30, 2021, which is a continuation of U.S. patent application Ser. No. 15/866,911 filed on Jan. 10, 2018, now U.S. Pat. No. 11,023,865 issued on Jun. 1, 2021, which is a continuation of U.S. patent application Ser. No. 13/833,752 filed on Mar. 15, 2013, now abandoned, entitled "METHOD AND SYSTEM FOR AUTOMATIC TASK TIME ESTIMATION AND SCHEDULING", which are incorporated herein, in their entirety, by reference.

FIELD

The described embodiments relate to estimating the length of time to complete tasks and scheduling tasks and, more particularly, to methods and systems for providing automatic task estimation and scheduling using both participant data and task data in the electronic learning and education industry.

BACKGROUND

Electronic learning (also called e-Learning or eLearning) generally refers to learning where participants engage in education related activities using computers and other computer devices. For examples, participants may enroll or participate in a course or program of study offered by an educational institution (e.g. a college, university or grade school) through a web interface that is accessible over the Internet. Similarly, participants may receive assignments electronically, participate in group work and projects by collaborating online, and be graded based on assignments and examinations that are submitted using an electronic dropbox or other similar service.

Electronic learning is not limited to use by educational institutions, however, and may also be used in governments or in corporate environments. For example, employees at a regional branch office of a particular company may use electronic learning to participate in a training course offered by another office without ever physically leaving their office.

SUMMARY OF SOME EMBODIMENTS

In a first aspect, some embodiments provide a computer-implemented method for automatic task time estimation and scheduling, using a computing device comprising at least one processor and at least one storage device, the method comprising the steps of:
  storing a plurality of media items on a computer-readable storage device of the computing device, each media item comprising content information;
  defining an aggregate task comprising a plurality of component tasks, wherein each task in the plurality of component tasks is defined in relation to at least one corresponding item in the plurality of media items;
  storing participant data for at least one participant on the computer-readable storage device;
  storing historical time data for the at least one participant on the computer-readable storage device;
  operating a processor of the computing device to determine a plurality of corresponding metadata attributes for the aggregate task by, for each component task in the aggregate task, deriving at least one corresponding metadata attribute from the at least one corresponding item for that component task; and
  operating the processor to determine a final time estimate for a participant in the at least one participants to complete the aggregate task based on at least the plurality of corresponding metadata attributes for that aggregate task, the participant data for the at least one participant, and the historical time data for the at least one participant.

In accordance with another aspect of some embodiments, there is provided a system for providing automatic task time estimation and scheduling, the system comprising:
  at least one computer-readable storage device configured to store i) a plurality of media items, each media item comprising content information, ii) at least one aggregate task comprising a plurality of component tasks, wherein each task in the plurality component tasks is defined in relation to at least one corresponding item in the plurality of media items; iii) participant data for at least one participant in a participant data module, and iv) historical time data for the at least one participant in a historical data module; and
  at least one processor linked for communication with the at least one computer-readable storage device and configured to i) determine a plurality of corresponding metadata attributes for the aggregate task by, for each component task in the aggregate task, deriving at least one corresponding metadata attribute from the at least one corresponding item for that component task, and ii) provide a time estimation module for determining a final time estimate for completing the aggregate task based on at least the plurality of corresponding metadata attributes for that aggregate task, the participant data of the at least one participant, and the historical time data of the at least one participant.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

DETAILED DESCRIPTION OF EXEMPLARY EMBODIMENTS

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices, in known fashion.

Each program may be implemented in a high level procedural or object oriented programming or scripting language, or both, to communicate with a computer system. Alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, and the like. Non-transitory computer-readable media comprise all computer-readable media, with the exception being a transitory, propagating signal. The term non-transitory is not intended to exclude computer readable media such as a volatile memory or RAM, where the data stored thereon is only temporarily stored. The computer useable instructions may also be in various forms, including compiled and non-compiled code.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, this description and the drawings are not to be considered as limiting the scope of the embodiments described herein in any way, but rather as merely describing the implementation of the various embodiments described herein.

The described embodiments are methods, systems and apparatus that generally relate to a computer-implemented system and method for providing automatic task time estimation and scheduling using individual participant data and task data.

In most electronic learning systems, some users are consumers, "learners" or "participants" and will participate in courses (e.g. by listening or watching lectures, conducting assignments, and taking quizzes, etc.) while other users are providers or "instructors" who may be responsible for preparing the course framework, including the course structure and/or materials (e.g. determining what topics are to be covered in a particular course, what assignments will be required, how performance is to be assessed, etc.). For the purpose of clarity and consistency, the consumers or "learners" are referred to as "participants"; and the providers or "instructors" are referred to as "users" in this application.

However, planning the framework of courses (e.g. selecting the course structure, organizing lecture materials, etc.) can be a difficult exercise. This is true generally with all forms of learning, but is particularly problematic in electronic learning systems.

For example, in a traditional course setting, it may be sufficient to prepare materials as the course is taught (e.g. a "just-in-time" approach) since the course normally follows a particular chronological sequence or timeline. However, in electronic learning systems some participants may be progressing through the course content at different rates of speed, or may review educational modules in different orders depending on particular interests. This may require the course structures and materials be determined in advance. Accordingly, it may be beneficial if the user, in planning the framework of courses, is able to ascertain how much time each participant is likely to spend on each individual task, a collection of various tasks, or a collection of course modules ("modules"). That is, users of an electronic learning system may desire to view or make use of an estimated value of time required for a participant to perform selected tasks in order to plan a course structure and materials. In addition, the user may also desire to access participants' class schedules or calendar information in order to better design a course framework that is fitting and customized for each participant.

In one exemplary embodiment of the present invention, a user is typically understood to be a person who uses the computer implemented system in order to obtain an estimate of the time required for one or more participants to finish one or more tasks. A user can upload, download, enter and edit participant data in the system. A user can also upload, download, enter and edit data of an aggregate or component task. The user may administrate the system and further customize the system as needed. In comparison, a participant typically logs into the system to execute an aggregate or component task, such as completing a series of mathematical problem sets (an aggregate task) or reading an English passage and answering related questions (a component task). A participant may or may not edit his or her own participant data.

In addition, the user is able to upload to or select from a database an aggregate task and participant data, then obtain an estimate of the time required for the participant to complete the aggregate task based on historical data. The user may also enter or modify various user-defined data in order to obtain a more accurate result. The computer implemented system may also compute an estimate of the time required for a participant to complete a workload (i.e., multiple aggregate tasks as explained below), such as completing an entire course. Based on the workload time estimate and the participant's calendar information, the system may further generate a customized calendar schedule suggesting the date and time to execute each of the aggregate and/or component tasks within the workload for the participant.

A workload may include multiple aggregate tasks, and each aggregate task may include multiple component tasks. Each component task contains at least one media item, and each media item has several metadata attributes including at least a length variable, a media item category or a difficulty level.

Figure 1:
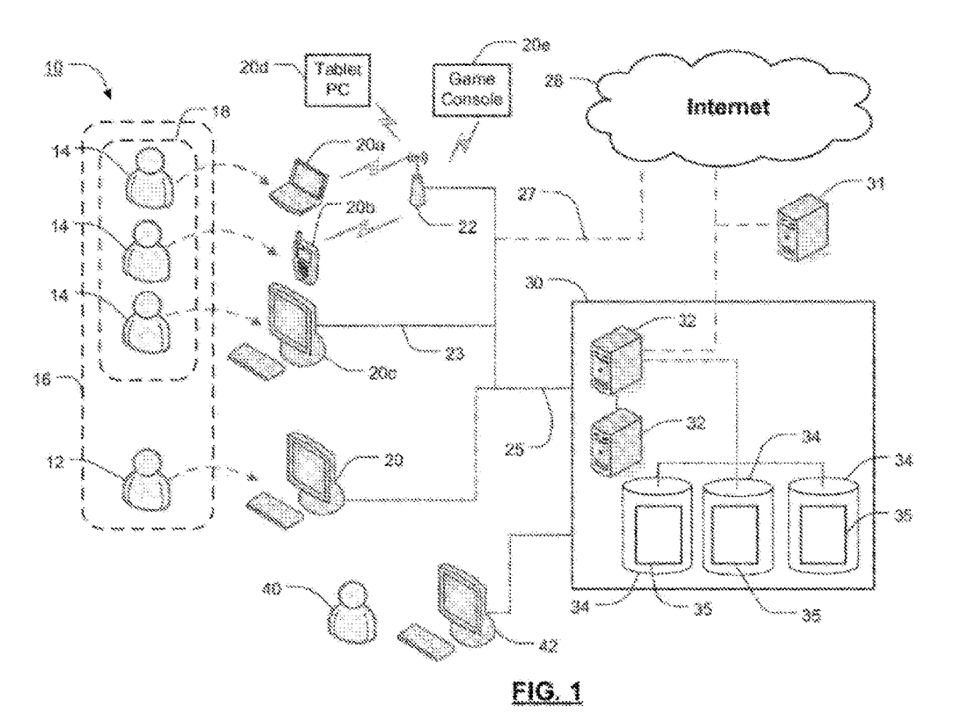
FIG. 1 is a block diagram illustrating an educational system for providing electronic learning, as well as automatic task time estimation and scheduling according to one embodiment.

Turning now to the block diagram of FIG. 1, illustrated therein is an educational system 10 for providing/facilitating electronic learning as well as automatic task time estimation and scheduling according to some embodiments.

Using the system 10, one or more individuals 12, 14 may communicate with an educational service provider 30 to participate in, create, and consume electronic learning services, including courses. In some embodiments, the educational service provider 30 may be part of or associated with a traditional "bricks and mortar" educational institution (e.g. a grade school, university or college), another entity that provides educational services (e.g. an online university, a company that specializes in offering training courses, or an organization that has a training department), or may be an independent service provider (e.g. for providing individual electronic learning). It should be understood that a course is not limited to formal courses offered by formal educational institutions. The course may include any form of learning instruction offered by an entity of any type. For example, the course may be a training seminar at a company for a small group of employees or a professional certification program with a larger number of intended participants (e.g. PMP, CMA, etc.).

In some embodiments, one or more educational groups can be defined that includes one or more of the individuals 12, 14. For example, as shown in FIG. 1, the individuals 12, 14 may be grouped together in an educational group 16 representative of a particular course (e.g. History 101, French 254), with a first individual 12 or "instructor" or "user" being responsible for providing the course (e.g. organizing lectures, preparing assignments, creating educational content etc), while the other individuals 14 or "participants" are consumers of the course content (e.g. individuals 14 are enrolled in the course).

In some examples, the individuals 12, 14 may be associated with more than one educational group (e.g. the users 14 may be enrolled in more than one course as participants, the first individual may be enrolled in at least one course as an participant while being responsible for teaching at least one other course as a user, or the first individual 12 may be responsible for teaching more than one courses as a user).

In some embodiments, educational sub-groups may also be formed. For example, two of the individuals 14 are shown as part of educational sub-group 18. The sub-group 18 may be formed in relation to a particular project or assignment (e.g. sub-group 18 may be a lab group) or based on other criteria. In some embodiments, due to the nature of the electronic learning, the individuals 14 in a particular sub-group 18 need not physically meet, but may collaborate together using various tools provided by the educational service provider 30.

In some embodiments, other groups 16 and sub-groups 18 could include individuals 14 that share common interests (e.g. interests in a particular sport), that participate in common activities (e.g. members of a choir or a club), and/or have similar attributes (e.g. individuals that are male, and/or under twenty-one years of age, etc.).

Communication between the individuals 12, 14 and the educational service provider 30 can occur either directly or indirectly using any suitable computing device. For example, the individual 12 may use a computing device 20 such as a desktop computer that has at least one input device (e.g. a keyboard and a mouse) and at least one output device (e.g. a display screen and speakers).

The computing device 20 can generally be any suitable device for facilitating communication between the individual 12, 14 and the educational service provider 30. For example, the computing device 20 could be a laptop 20a wirelessly coupled to an access point 22 (e.g. a wireless router, a cellular communications tower, etc.), a wirelessly enabled personal data assistant (PDA) 20b or smart phone, a terminal 20c, a tablet computer 20d, or a game console 20e over a wired connection 23.

The computing devices 20 may be connected to the service provider 30 via any suitable communications channel. For example, the computing devices 20 may communicate to the educational service provider 30 over a local area network (LAN) or intranet, or using an external network (e.g. by using a browser on the computing device 20 to browse to one or more web pages presented over the Internet 28 over a data connection 27).

In some examples, one or more of the individuals 12, 14 may be required to authenticate their identities in order to communicate with the educational service provider 30. For example, the individuals 12, 14 may be required to input a login name and/or a password or otherwise identify themselves to gain access to the system 10.

In some examples, one or more individuals (e.g. "guest" users or participants) may be able to access the system without authentication. Such guests may be provided with limited access, such as the ability to review one or more components of the course, for example, to decide whether they would like to participate in the course.

In some embodiments, the wireless access points 22 may connect to the educational service provider 30 through a data connection 25 established over the LAN or intranet. Alternatively, the wireless access points 22 may be in communication with the educational service provider 30 via the Internet 28 or another external data communications network. For example, one individual 14 may use a laptop 20a to browse to a webpage that displays elements of an electronic learning system (e.g. a course page).

The educational service provider 30 generally includes a number of functional components for facilitating the provision of social electronic learning services. For example, the educational service provider 30 generally includes one or more processing devices 32 (e.g. servers), each having one or more processors. The processing devices 32 are configured to send information (e.g. HTML or other data) to be displayed on one or more computing devices 20 in association with the social electronic learning system 10 (e.g. course information). In some embodiments, a processing device 32 may be a computing device 20 (e.g. a laptop or personal computer).

The educational service provider 30 also generally includes one or more data storage devices 34 (e.g. memory, etc.) that are in communication with the processing devices 32, and could include a relational database (such as a Structured Query Language (SQL) database), or other suitable data storage devices. The data storage devices 34 are configured to host data 35 about the courses offered by the service provider (e.g. the course frameworks, educational materials to be consumed by the individuals 14, records of assessments done by individuals 14, etc.).

The data storage devices 34 may also store authorization criteria that define what actions may be taken by the individuals 12, 14. In some embodiments, the authorization criteria may include at least one security profile associated with at least one role. For example, one role could be defined for individuals who are primarily users responsible for developing an educational course, teaching it, and assessing work product from participants for that course. Users with such a role may have a security profile that allows them to configure various components of the course, post assignments, add assessments, evaluate performance, and so on.

In some embodiments, some of the authorization criteria may be defined by specific individuals 40 who may or may not be part of the educational community 16. For example, individuals 40 may be permitted to administer and/or define global configuration profiles for the system 10, define roles within the system 10, set security profiles associated with the roles, and assign the roles to particular individuals 12, 14 in the system 10. In some embodiments, the individuals 40 may use another computing device (e.g. a desktop computer 42) to accomplish these tasks.

The data storage devices 34 may also be configured to store other information, such as personal information about the individuals 12, 14 of the system 10, information about which courses the individuals 14 are enrolled in, roles to which the individuals 12, 14 are assigned, particular interests of the individuals 12, 14 and so on.

The processing devices 32 and data storage devices 34 may also provide other electronic learning management tools (e.g. allowing individuals to add and drop courses, communicate with other individuals using chat software, etc.), and/or may be in communication with one or more other vendors that provide the tools.

In some embodiments, the system 10 may also have one or more backup servers 31 that may duplicate some or all of the data 35 stored on the data storage devices 34. The backup servers 31 may be desirable for disaster recovery (e.g. to prevent undesired data loss in the event of an event such as a fire, flooding, or theft).

In some embodiments, the backup servers 31 may be directly connected to the educational service provider 30 but located within the system 10 at a different physical location. For example, the backup servers 31 could be located at a remote storage location at a distance from the service provider 30, and the service provider 30 could connect to the backup server 31 using a secure communications protocol to ensure that the confidentiality of the data 35 is maintained.

Figure 2:
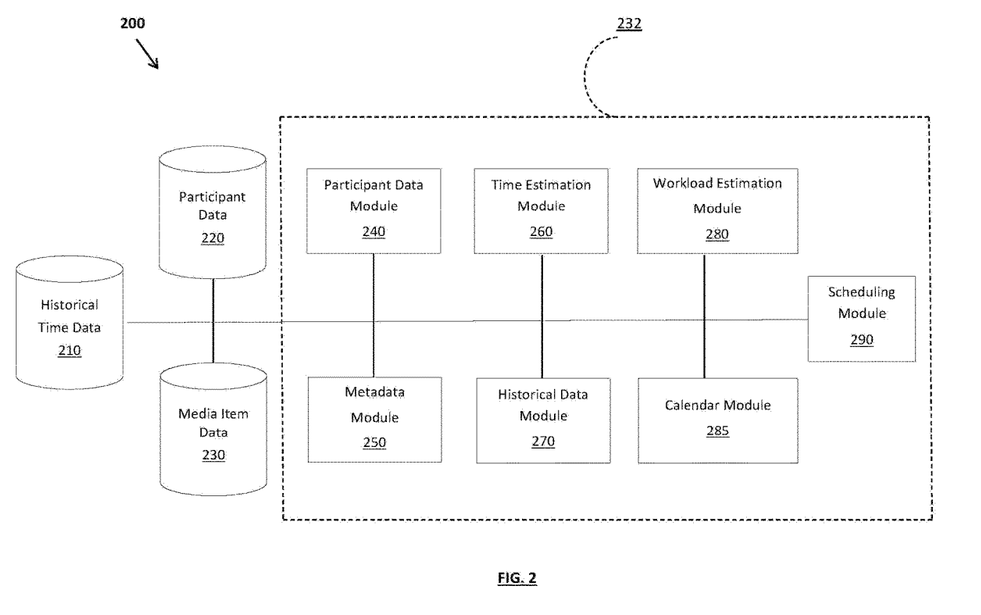
FIG. 2 is a block diagram showing an educational service provider system for automatic task time estimation and scheduling according to one embodiment.

Reference is now made to FIG. 2, which illustrates a block diagram of an educational service provider system 200 in one exemplary embodiment of the invention. As described above, the system can comprise at least one processing device (e.g. a server) 232 and data storage devices 210, 220 and 230, as well as communication links for receiving information from and sending information to users and participants. The educational service provider system or "system" 200 is operable to receive task data and participant data from users and then store the data in media item database 230 and participant database 220, respectively. The system 200 is also operable to receive real-time task execution information from participants as they complete tasks via educational service provider system 200. That is, the system 200 can monitor and record the actual amount of time spent by each participant on each task. Each task (component or aggregate) completed by a participant via the system 200 can have a corresponding completion time as incurred in real life by the participant. For example, if participant John spent 3 hours reading a chapter on European History, then the system 200 can record 3 hours as the historical completion time for the media item (i.e., the chapter) and the corresponding task. If within the 3 hours, John took a half-hour (0.5 hr) break, then 2.5 hours can be recorded as the value for the historical completion time, and 0.5 hour can be recorded as a break period value, for the media item and the corresponding task. All these historical values or information can then be analyzed and stored in historical time database 210. In one exemplary embodiment, seven modules (240, 250, 260, 270, 280, 285 and 290) in the form of processor-operable instructions are included in the at least one processing device 232. These modules (240, 250, 260, 270, 280, 285 and 290), operable via the processor, can obtain data from databases 210, 220 and/or 230 as well as from general user and/or participant input to compute an estimated time required for one or more participants to finish selected tasks.

Historical time database 210 can contain the historical data of participants. Each participant can have an ID #, which can be a student number (user-defined data) or a number assigned by the processor. As illustrated in Table 1 below, for each participant, there is stored an average rate spent per media item(s) per difficulty level per media item category (or "average rate per media item(s) per difficulty level" for short). Historical time database 210 also stores the actual time spent per component task and per aggregate task for each participant (not shown in Table 1), which can be used to calculate the average rate data for each participant and each class of participants, as further described below.

TABLE 1

Sample Participant Record stored in Historical Time Database 210

| Participant ID # | Media Item Category | Difficulty Level | Average Rate Spent per Media Item(s) (Component Task) per Difficulty Level |
|---|---|---|---|
| 000012345 | Text | . . . | . . . (second/word) |
| | Image | 1 | 2.4 (second/image) |
| | | . . . | . . . |
| | | 5 | 9.8 (second/image) |
| | Video | . . . | . . . (second/second) |
| | Audio | | . . . (second/second) |
| | Question | | . . . (second/question) |
| | Hybrid (user-defined) | . . . | . . . (second/task) |
| 000012346 | . . . | . . . | . . . |

A media item can be associated with one component task. That is, to complete the component task containing a media item, a participant can: 1) observe an image; 2) read a text passage; 3) watch a video clip; 4) listen to an audio clip; or 5) answer a question. Each of these activities has, respectively, a participant-dependent "processing rate" as listed: 1) observing rate at seconds per image; 2) reading rate at seconds per word; 3) watching rate at second per second; 4) listening rate at second per second, and 5) answering rate at seconds per question, respectively. These processing rates can be calculated by historical data module 270 based on the actual time spent (i.e., historical completion time) per component task for each participant recorded and stored in the historical time database 210 by the educational service provider system 200. The calculated processing rates can then be stored in historical time database 210 as average rate spent per media item (component task) per difficulty level, as illustrated in Table 1. For example, a participant with ID #000012347 may have completed three different component tasks associated with the media item category text and difficulty level 4. That is, the participant has so far, through educational service provider system 200, finished reading three different text passages with a difficulty level of 4. For each of the three component tasks associated with the media item category text and difficulty level 4, the historical data module 270 can operate the processor to extract the associated text passage, derive the word count of the associated text passage in a known manner, then calculates the average seconds spent by the participant per word based on the historical completion time value of the component task. For each component task associated with the media item category text and difficulty level 4, there can be a calculated average rate Xt, in seconds per word, spent by the participant in completing the task. The processor can then calculate, for participant with ID #000012347, the final average rate spent per media item (component task) per difficulty level as stored in Table 1 for media item category text and difficulty level 4 by taking the numerical average of the group of three calculated average rates, where each calculated average rate Xt corresponds to a component task of media item category text and difficulty level 4.

At the same time, multiple media items can be associated with one component task. That is, to complete the component task containing multiple media items, a participant can, for example: 1) read a text passage and answer one or more related questions; 2) watch one or more videos followed by listening to one or more audios; and 3) observe one or more images and answer one or more related questions. Such component task can have a user-defined, hybrid media item category (as illustrated in Table 1), along with a user-defined difficulty level for each or some of the media items included in the task. The historical data module 270 can then calculate and store the average rate spent per media items (i.e., component task) per difficulty level for each participant in a similar manner as it calculates the average rate for component tasks composed of single media item.

In one exemplary embodiment, a curve fitting algorithm (not shown) is used by the historical data module 270 to determine a best-fit mathematical model for each value representing the average rate per media item(s) per difficulty level for each participant. The curve fitting methods can include higher order polynomials, polynomial curve fitting and error-least squares method.

In yet another exemplary embodiment, a correction algorithm (not shown) can use the historical time data to apply a correction factor to the calculated average rate per media item(s) per difficulty level to account for various delays such as network or machine latency in educational service provider system 200. For example, the correction algorithm can be configured to take the historical time data available regarding completion of similar component tasks (e.g. within the same or a similar difficulty level and/or media category) by a participant, and plot the corresponding time spent per media item(s) per difficulty level against a selected time period or range (e.g., against a period from 7 AM to 8 PM). The historical data may be further grouped or otherwise manipulated based on the length of each component task. A correction factor may then be generated based on the data or plot and subsequently applied to adjust the calculated average rate per media item(s) per difficulty level, taking into consideration of the network or machine latency (represented by the correction factor) at certain times of the day. In another example, autoregressive moving average model (ARMA) may be used by the correction algorithm to achieve a similar result. It is worth noting that the correction algorithm may be configured and applied in conjunction with the curve fitting algorithm, or may be a standalone algorithm deployed to improve the accuracy of the calculated average rate per media item(s) per difficulty level.

Participant database 220 can store participant-specific information for each participant on record. The stored data can include participant ID, name, age, educational level, current grade, current class, university major, post-graduate field, contact information and many other kinds of information regarding each participant. As mentioned above, the database 220 can also store participant-specific time factors. The database can be structured such that the processor may look up multiple participants at once according to one or more parameters. For example, the processor may retrieve the participant IDs belonging to a certain class or university major. The participant IDs in participant database 220 can be the same as (or cross-referenced to) those in historical time database 210 so that the processor is capable of looking up the appropriate historical time data of each participant.

Media item database 230 can store all relevant information regarding aggregate and component tasks. For each component task, the database 230 can store a media item category, a length variable, a difficulty level, a corresponding component task ID and a corresponding aggregate task ID. For each aggregate task, the database 230 can store an overall difficulty level, total number of media items in each media item category, and many other kinds of information.

In one exemplary embodiment, education service provider system 200 can provide a course to participants. The course can be an aggregate task. The course aggregate task can further be broken into multiple, smaller aggregate tasks, such that each smaller aggregate task is in the form of a course chapter (e.g. "Basic Linear Algebra"). Each chapter aggregate task can include multiple component tasks, where each component task represents an individual task or activity such as "Chapter 1 Quiz 1" or "Chapter 1 Flashcards".

In another exemplary embodiment, a quiz containing 15 questions can be a component task. Each of the 15 questions can be a single media item. A participant can start working on the quiz or component task at one point in time, stop in the middle of the quiz (e.g. stop after finishing question #6), then save any progress he or she has made at this point in time and finish the component task at a later time. That is, education service provider system 200 is capable of resuming an activity or a component task from where the participant has left off last time.

In yet another exemplary embodiment, a component task can contain a single media item, for example, an English text passage. As a participant finishes reading the text passage, he may click on a button on the system 200 interface to indicate that he is done reading, and the system 200 can cause the interface to display the next component task, which can be a series of questions based on the English text passage the participant has just read. Alternatively, a component task can include multiple media items, the first media item being the English text passage, and the rest of the media items being questions. Regardless of how the media items are organized into one or more component tasks, education service provider system 200 can always keep track of how many activities or media items a participant has completed and where the participant has left off.

A media item can belong to one of the following media item categories: image, text, video, audio, question, or hybrid. A single media item can be associated with one individual component task. As described above, to complete the individual task containing a single media item, a participant can: 1) observe an image; 2) read a text passage; 3) watch a video clip; 4) listen to an audio clip; or 5) answer a question, etc. Alternatively, one or more media items can also be associated with a single component task via a user-defined media item category. That is, there can be multiple media items associated with a component task, where the multiple media items can include media content such as images, text, videos, audios, questions, and/or any other type of media content. All of the media items in a component task with multiple media items can be assigned hybrid as the media item category, regardless of the specific media content in each of the multiple media items. The hybrid category can be assigned by the user upon creation of the component task. Where a component task includes only one media item, the processor can link the component task with the specific category of the media item in the media item database 230; likewise, where a component task includes multiple media items, the processor can link the component task with category hybrid in the media item database 230. Multiple component tasks can form an aggregate task, which can correspond to a test or an assignment in real life.

Participant data module 240 can operate the processor to look up the selected participant(s) from participant database 220, extract the appropriate participant-specific information from the database 220, and then send the information to time estimation module 260.

Metadata module 250 can operate the processor to extract or derive component tasks and metadata attributes from a given aggregate task, and then store the component tasks along with the extracted metadata attributes into media item database 230. It can also send the appropriate information about selected aggregate or component task(s) to time estimation module 260.

Metadata module 250 can extract or derive metadata attributes from a given aggregate task by:
  parsing the aggregate task into separate, individual component tasks such that each component task is associated with one or more media item(s);
  storing each component task into media item database;
  for each component task, determining the media item category (a metadata attribute) of each of the media item(s) associated with the component task based on factors such as the file extension(s) of the content of the media item and/or user input; and
  once a media item category is determined for the media item, causing the processor to derive the length variable and, if appropriate, the difficulty level of the media item in accordance with a set of instructions based on the media item category.

The instructions for deriving metadata attributes from the respective content of the media item may be different depending on the specific media item category. Two main metadata attributes are noted specifically for determining a time estimate: 1) the length variable (or "length" for short) and 2) the difficulty level. The length of a media item can generally be determined from the file properties of the media item. For example, an English text passage has a word or a character count that can be used to denote the length of the media item. In a similar fashion, the length of a video or audio clip can be the running time. In the case of images, the length for each image can either be a user-defined field that requires user input upon creation of the media item in the educational service provider system 200, or estimated based on the difficulty level of the media item (i.e., the image). In the case of questions, the length can be estimated based on the word and/or character count, or alternatively, a user-defined field that requires user input upon creation of the media item in the educational service provider system 200. As well, in the case of a component task with multiple media items, the length can be a user-defined field that requires user input. Once the processor has extracted the length variable and difficulty level from the media item based on the media item category and where appropriate, user input, the processor can link the metadata attributes with the specific component task associated with the media item.

A difficulty level can be one of the metadata attributes of a media item, a component task or an aggregate task. The difficulty level can be a user-defined or system-derived variable. The difficulty level denotes, on a user-defined or system-defined scale, the degree of difficulty of the task in question. For example, a participant may on average spend 0.8 second per word in reading a text passage in a media item with difficulty level 1 on a scale of 1 to 10; the same participant may on average spend 5 seconds per word in reading another text passage in a media item with difficulty level 8 on the same scale. Therefore, the difficulty level of a media item, and thus of the associated component task, can be a factor in estimating the time a participant likely would spend on a particular component task. Moreover, an aggregate task may have an aggregate difficulty level that is applied across the board to denote the difficulty level for all component tasks within the aggregate task. Where a component task includes only a single media item, the difficulty level of a component task may also be expressed and understood as the difficulty level of the media item associated with the component task.

A user can define the difficulty level of a component or aggregate task by entering a numeric value, as user input, that designates a difficulty level in a metadata attribute fields for a particular media item. The allowable range, precision and/or decimal place of the numeric value representing a difficulty level for the tasks may be defined ahead of time by either a system administrator or a user.

Alternatively, depending on the specific media item category to which the media item belongs, the processor, in the absence of user-defined values, may derive a difficulty level for the media item. The processor can derive the difficulty level at the same time (that is, in the same module) as it derives the other metadata attributes of the media item. As previously described, the algorithm/instructions for deriving metadata attributes from the respective content of the media item may be different, an English text passage may have a difficulty level of 2 or 3 on a scale of 1-10 if the vocabulary in the content is judged to be fairly easy; whereas a passage with complex vocabulary may be given a difficulty level of 5. The "judging" of difficulty level can be a pre-determined algorithm or per user input. In another example, if the aggregate task given is a mathematical problem set, then the length variable for the aggregate task can be determined based on the total number of questions; while the difficulty level can be determined based on the number and frequency of complex mathematical operators such as multiplication, division, derivative, et al.

Videos and audios may or may not have difficulty level variables, subject to speech recognition algorithms. That is, speech recognition algorithms can recognize particular terms or words as proxies for different levels of difficulty of subject matter, and a difficulty level can then be attributed to the video or audio based on an algorithm that aggregates difficulty levels of all of the terms recognized. Please note, of course, that the ranges described can include real numbers, such as, for example, a difficulty of 2.89 in an English text passage, such that relatively fine-grained judgments regarding the difficulty of the material can be made.

In one exemplary embodiment, if the processor determines that the media item category is mathematical text, then the processor is configured to derive a difficulty level based on the mathematical operators in the text, and a length variable based on the word count of the text, wherein both the mathematical operators and the word count are derived from the content information of the mathematical text.

In another exemplary embodiment, if the processor determines that the media item category is English problem set, then the processor is configured to derive a difficulty level based on the vocabulary in the English problem set, and a length variable based on the total number of questions in the English problem set, wherein both the vocabulary and the total number of questions are derived from the content information of the English problem set.

In yet another exemplary embodiment, if the processor determines that the media item category is mathematical problem set, then the processor is configured to derive a difficulty level based on the mathematical operators in the mathematical problem set, and a length variable based on the total number of questions in the mathematical problem set, wherein both the vocabulary and the total number of questions are derived from the content information of the mathematical problem set.

Historical data module 270 can operate the processor to look up historical data from historical time database 210, extract the appropriate historical time information from the database 210, and then send the information to time estimation module 260. The historical time information extracted may be of one or more participants, depending on the request from the time estimation module 260, as described next.

Time estimation module 260 can receive a user request to calculate an estimated time for one or more participants to complete an aggregate or component task based on input from at least three modules, i.e., participant data module 240, metadata module 250, and historical data module 270. It can execute the user request by running a set of programmed instructions, configuring the processor to compute the estimated time for a single participant in the manner described below. If the user request includes multiple participants, time estimation module 260 can compute the estimated time for each participant individually.

In one exemplary embodiment, the processor can be configured to look up an individual participant from historical time database 210 via the historical data module 270 to see if there is any relevant, applicable historical data from the participant's historical completion time data. It will be appreciated that the processor can be configured to look up data from historical time database 210 without any specific module as well.

In some embodiments, the processor can be first instructed to look up the length and media item category of the media item associated with each component task from media item database 230 via metadata module 250. Since the component tasks in an aggregate task are already stored in media item database 230, the processor can retrieve the length and media item category values based on the component task given. Next, the processor can be instructed to search the historical time database 210 for the specific participant (e.g., student A) at hand. If the processor is able to locate the participant in the historical time database 210, it can further seek historical data corresponding to a matching media item category and a matching difficulty level based on the component task at hand. However, if the processor fails to locate historical data (average rate) for the matching difficulty level under the matching media item category, the processor can then look to the closest difficulty level(s) available to determine the estimated average rate of the component task on hand. For example, if the processor cannot locate average rate spent per media item or component task for difficulty level 2, but can locate the values for difficulty levels 1.8 and 2.1 (assuming 1.8 and 2.2 are the closest available difficulty levels on each side of 2 respectively), the processor can then be configured to take the numeric average of the two values found under difficulty levels 1.8 and 2.1 and to use the calculated average for difficulty level 2, all within the same media item category for the same participant. Alternatively, the processor can estimate an average rate for desired difficulty level X based on a number of different difficulty levels, each of which is weighted in importance according to how close it is to the desired difficulty level X.

If the processor fails to locate historical data for the same media item category under the participant, or fails to locate any historical data under the participant, then it can look to a pool of alternative participants who share at least one characteristic with the participant. This one characteristic may be age, educational background, class, school, gender, et al. The characteristic may be determined based on some user input. The user may also designate more than one characteristic(s) in order to gather more relevant historical data. For example, the user may pick a pool of alternative participants that have the same age and the same educational background. Once the pool is chosen, the alternative participants may form a class of participants that can provide historical data against which the processor can determine the average rate for the original participant to complete the component task associated with a media item.

Once the average rate spent per media item(s) is determined, the processor can calculate the value of the final time estimate for completing the aggregate task using a predetermined method. In one exemplary embodiment, the value of the final time estimate required for completing an aggregate task is determined by adding the sum of all the estimated time values, each of which corresponds to completing a single component task in the aggregate task, for all the component tasks in the aggregate task, with an additional average total time between the component tasks. The estimated time value for completing a single component task can be determined by: 1) in the case of a single media item, multiplying the length of the media item with the average rate spent per media item(s) at a specific difficulty level and a specific media item category; or 2) in the case of multiple media items in the component task, multiplying the user-defined length of the media items with the average rate spent per component task at a specific difficulty level and a specific media item category. The average total time between component tasks can be determined by retrieving the historical completion time data on all component tasks, storing the differences then averaging them. The average total time between component tasks can be further refined by removing outlier data through statistical functions and filtering to results within two standard deviations with standard statistic functions. In another embodiment, the time estimation module 260 can be also configured to calculate the average total time between component tasks based on a variety of participant-specific time factors from the participant database 220.

Length of media item as well as average rate spent per media item(s) at a specific difficulty level in a specific media item category can be obtained in the manner described above. The product of these two values can be the estimated time for completing each component task, respectively. Sum of the estimated time values calculated for the entire component tasks can serve as a basic time estimate for completing the corresponding aggregate task. The calculated average total time between component tasks can then be added to the basic time estimate for completing the aggregate task to form the value of the final time estimate for a single participant to complete the given aggregate task.

The processor can look the participant up on the participant database 220 via participant data module 240 to extract a variety of participant-specific time variation factors from the participant data. For example, a settling time factor, an idle time factor, and a packing-up time factor. A settling time factor represents the time period between the point in time when a participant opens a component task and the point in time at which he/she actually starts performing the component task. An idle time factor represents the amount of time a participant spends idling—that is, when he/she is not actively completing the component task even though the component task is open. A packing-up time factor represents the time period between the point in time when a participant finishes a component task and the point in time at which he/she closes down the component task.

The processor can be further configured to, based on the various factors, calculate the appropriate settling time, an idle time, a packing-up time, all of which can be used to calculate the average total time between component tasks making up the aggregate task. Optionally, a task-dependent time factor can then be used to account for the complexity (or difficulty level) of each of the component tasks and further modify the improved time estimate. For example, it is possible that the more difficult the previous component task is, the longer a participant would likely need in order to finish the next component task, due to mental exhaustion etc. The task-dependent time factor can be used to take this into account. Further optionally, the order of component tasks making up an aggregate task can be changed to see if the total amount of time required to complete the aggregate task changes as a result.

Figure 3:
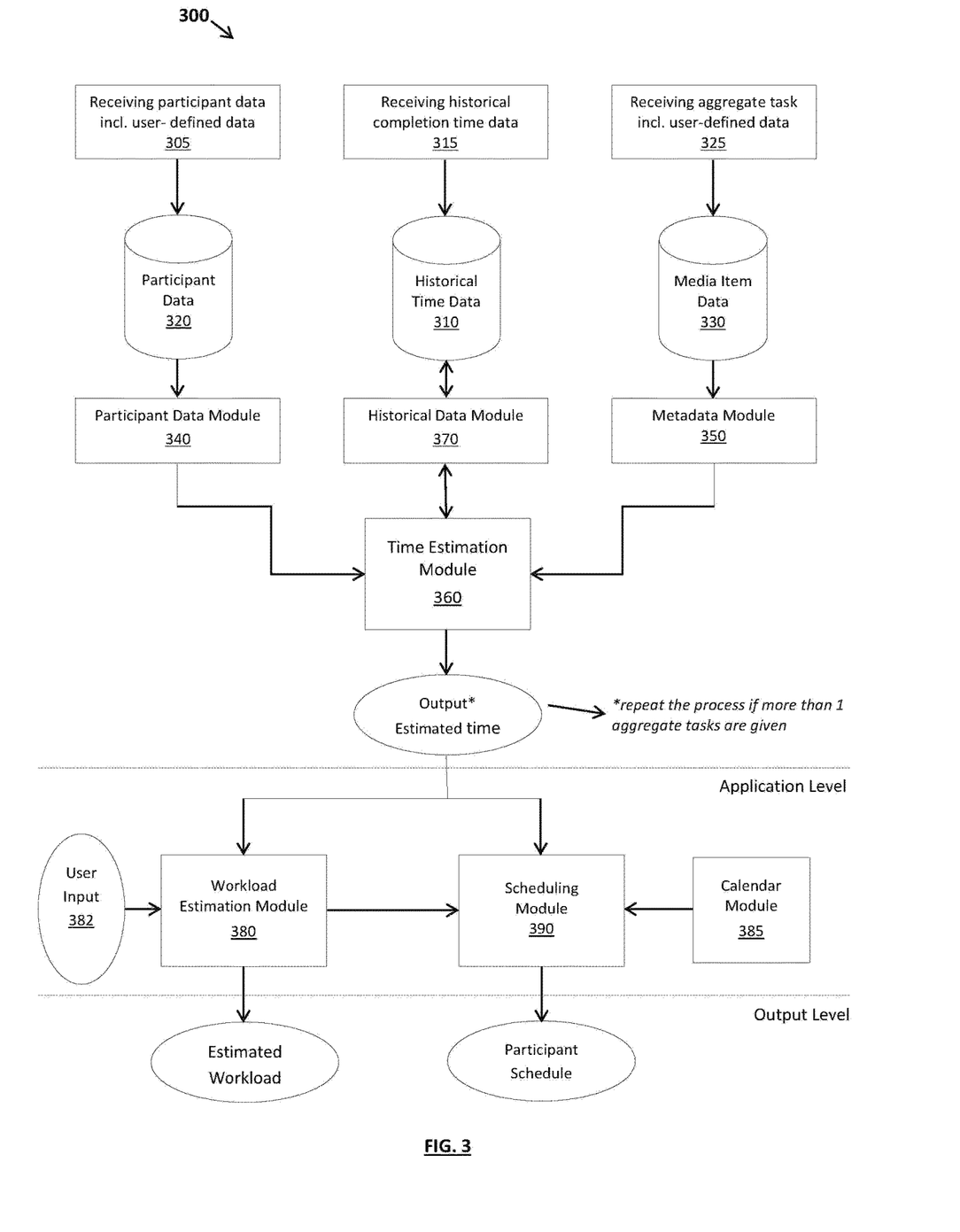
FIG. 3 is a flowchart illustrating a method of providing automatic task time estimation and scheduling according to one embodiment.

Once the value of the final time estimate for a single participant to complete the given aggregate task is determined, it can be delivered, logged, stored, and once the participant has actually completed the aggregate task, compared with the actual time it takes for the participant to complete the aggregate task (i.e., the historical completion time for the aggregate task). In a similar fashion, the time estimate for a component task can also be stored and compared with the actual time taken, i.e., the historical completion time for the component task, by the participant to complete the component task. Any variance between the estimated time value and the respective historical completion time value can also be logged and optionally used as an input for an optional correction module that may be part of the time estimation module 360. The correction module can be used to edit the time estimation algorithm in real time. That is, for each participant in the participant database 320, every time the participant has finished a task in real time and the corresponding historical completion time value is recorded and stored in historical time database 310, the correction module can operate the processor to retrieve the corresponding time estimate for the task, if such time estimate exists in the historical time database 310. The correction module can then calculate and store a variance factor for the respective task based on the value of the time estimate and the corresponding historical completion time for a participant to finish the task, which can be a component task or an aggregate task. For example, if the value of the final time estimate for completing a component or aggregate task is determined by the time estimation module 360 to be 100 minutes (or its equivalent value in seconds), and the historical completion time for the same is 120 minutes (or its equivalent value in seconds), then the variance factor can be determined by dividing the historical completion time by the value of the final time estimate, which yields the ratio 1.2. This final variance factor can be calculated as an average value of multiple individual variance factors, where each individual variance factor corresponds to a component task of a specific media item category at a specific difficulty completed by a participant. Alternatively, the final variance factor can be calculated as the average of all individual variance factors across all tasks done by a participant, regardless of the media item category or the difficulty level. Every time a new time estimate has been determined by the time estimation module 360, the correction module can check to see if the most up-to-date, applicable final variance factor meets a certain pre-determined numeric threshold (e.g. greater than 1.1 or less than 0.9). If the final variance factor meets the threshold, the correction module or the time estimation module 360 can operate the processor to multiply the value of the time estimate by the most up-to-date applicable final variance factor in order to obtain a more accurate result. This new result can then replace the previous time estimate to be the value of the new time estimate, which can be a time estimate for a component task, or a final time estimate for an aggregate task. Once the participant has completed the corresponding task, the correction module can then operate the processor to update the appropriate final variance factor(s) based on the variance, if any, between the time estimate and the actual time spent by the participant to finish the task.

Based on further user input and the estimated time output from time estimation module 260, workload estimation module 280 can be further implemented to determine the estimated time for a participant to finish an entire workload.

Based on the workload time estimate and the participant's calendar information, the system may further generate a customized calendar schedule, via calendar module 285 and scheduling module 290, suggesting the date and time to execute each of the aggregate and/or component tasks within the workload for a participant. Such a workload may spread over days, weeks, or months for a participant to finish. A user, such as a course instructor or tutor, may use such information to prepare and plan for a course based on the participants' (students') background information.

Reference is now made to FIG. 3, which is a flowchart illustrating a method of providing automatic task time estimation and scheduling.

In one exemplary embodiment illustrated by FIG. 3, the educational service provider 300 receives participant data including user-defined data 305 and causes the processor to store them in participant database 320. It also records historical completion time data 315, i.e., the actual time spent by participants on various tasks, and causes the processor to store these times in historical time database 310. As well, it receives aggregate task data including user-defined data 325 and causes the processor to store it in media item database 330.

Every time a participant starts a component task, either as a standalone task or as part of an aggregate task, the processor can record the actual time spent by a participant on each component task, whether he/she finishes it or not. These actual values of time spent per media item by the participant can then be sorted and stored as historical completion time values in historical time database 310. In addition, as described earlier, historical data module 370 can retrieve the historical completion time values from historical time database 310, determine the average rate spent per component task per difficulty level for each participant based on the retrieved data, and then store the calculated values in the historical time database 310. The historical data module 370 can coordinate with the other modules (participant data module 340 and metadata module 350) to further break down the average time spent per media item by difficulty level and media item category.

In one exemplary embodiment of the educational service provider system 300, in order for the system 300 to keep track of actual time spent on each component task, the processor monitors each participant as he or she logs in, starts, resumes, and finishes the tasks on a computing device connected to the system 300 over a network.

In another embodiment of the educational service provider system 300, a participant can enter the start time and the completion time on the computing device so that this information can be accurately transmitted to educational service provider system 300.

In yet another embodiment of the educational service provider system 300, the processing device 232 monitors each participant as he or she logs in, starts, resumes, and finishes the tasks on a computing device connected to the system 300 over a network, as well as keeps track of when a video or audio finishes playing, or when a question is answered. The processing device 232 can also record when each participant flips a virtual page in the electronic learning environment on a computing device, as each virtual page can be implemented to include precisely one component task, so the processing device 232 knows when the participant is done a single component task, which may comprise multiple media items of various media item categories. For example, a component task on a virtual page may be an English passage and five related questions. This component task then includes two media item categories: text and question (i.e., user-defined hybrid category). The participant needs to finish reading the English passage and answering the five questions before the task is marked complete. The processing device 232 can record the time the participant takes to complete the entire task in one session or over multiple sessions and store the recorded value as historical completion time data in historical time database 310.

The processor or processing device 232 can also record the settling time, idle time, as well as packing-up time spent by the participant during the process of completing an aggregate task. The average value of each of the settling time, idle time and packing-up time, which are recorded over multiple tasks, can then be determined and stored as participant-specific settling time factor, idle time factor, and packing-up time factor, respectively. A settling time factor represents the time period between the point in time when a participant opens a task and the point in time at which he/she actually starts performing the task. An idle time factor represents the amount of time a participant spends idling—that is, when he/she is not actively completing the task even though the task is still open. A packing-up time factor represents the time period between the point in time when a participant finishes a task and the point in time at which he/she closes down the task. All of these recorded time values can then be stored into historical time database 310 and in the case of participant-specific time factors, stored into the participant database 320 as well.

In addition, idling time can be determined in part based on historical completion time data. That is, if a participant is performing a task containing a media item (e.g. reading a text passage) of a certain difficulty level X, the processing device 232 can retrieve relevant historical completion time data from historical time database 310 to see how long the participant typically, based on the historical data, takes to review the content of the media item of the media item category at difficulty level X. If the participant ends up taking much more time, then the processing device 232 can take the difference between the historical time data and the actual time spent as a value for idling time.

In another embodiment of the educational service provider system 300, the idling time can be further correlated with the actual time of the day, as well as how long the participant has been working.

The time estimation module 360, as described above, takes input from participant data module 340, historical data module 370, and metadata module 350 to determine the estimated time required for a participant to finish a component or aggregate task, which then forms the output of the module 360. In another embodiment, time estimation module 360 can also take the historical completion time data 315 as a direct input in the process of computing the estimated time if a participant is performing a task on a computing device connected to the educational service provider 300 at the same time as the education service provider 300 is determining an estimated time for the participant to finish a task.

Based on further user input 382 and the estimated time output from time estimation module 360, workload estimation module 380 can be further implemented to determine the estimated time for a participant to finish an entire workload. A workload, as previously described, may include multiple aggregate tasks, such as a series of reading assignments in an English course.

Based on the workload time estimate and the participant's calendar information, the system may further generate a customized calendar schedule, via calendar module 385 and scheduling module 390, suggesting the date(s) and time(s) to execute each of the aggregate and/or component tasks within the workload for a participant. Such a workload may spread over days, weeks, or months for a participant to finish. A user, such as a course instructor or tutor, may use such information to prepare and plan for a course based on the participants' (students') background information. In one exemplary embodiment, calendar events can be created based on each component or aggregate task as well as participant input or preference. That is, for a participant, a default event can be created for a single component with a start date and a due date. The start date of the event can be pre-determined by a user based on a course schedule; alternatively, the start date can be determined via participant input or preference in a known manner. The end date of the event can be the due day of the component task or corresponding aggregate task. In addition, an event can be broken into shorter sessions if a participant has entered preference(s) regarding the maximum duration of an event or session, where the event or session represents a continuous period (e.g. daily study session) during which a participant can be expected to perform a task without break. The calendar module 385 and the scheduling module 390 can also take into account a default break period based on a participant's preference. Furthermore, in another exemplary embodiment, after a customized calendar schedule is created, the participant or user can modify the schedule as desired via a user interface.

Furthermore, another embodiment of the invention can schedule various tasks and workloads for different participants all at once, and determine the best class or homework schedule for a class of participants.

The present invention has been described here by way of example only. Various modification and variations may be made to these exemplary embodiments without departing from the spirit and scope of the invention, which is limited only by the appended claim.

We claim:

1. A computer-implemented method for automatic task time estimation and scheduling for electronic learning, using a computing device comprising at least one processor and at least one computer-readable storage device, the method comprising the steps of:

providing a plurality of media items on the computer-readable storage device, each media item comprising content information, each media item associated with a media item category;

providing historical time data for at least one participant on the computer-readable storage device, wherein for each participant in the at least one participant, the historical time data comprises a plurality of historical completion time values stored on the computer-readable storage device, wherein each historical completion time value is stored in relation to a plurality of factors of a media item comprising an average rate per media item(s) per difficulty level of the media item for the each participant in the at least one participant, wherein the average rate per media item per difficulty level is determined using a correction factor based on a network or machine latency for the each participant in the at least one participant;

operating a processor of the computing device to determine a plurality of corresponding metadata attributes for an aggregate task by, for each component task in the aggregate task, deriving at least one corresponding metadata attribute from the at least one corresponding item for that component task, the at least one corresponding metadata attribute comprising the difficulty level for a corresponding media item in the plurality of media items;

operating the processor to determine a final time estimate for the participant to complete the aggregate task based on at least the plurality of corresponding metadata attributes for that aggregate task, participant data for the participant, and the historical time data for the participant or other participants in the at least one participant, and operating the processor to update the final time estimate for the participant to complete the aggregate task based on a numeric value representing a variance factor, wherein the numeric value representing the variance factor is determined based on the historical completion time values and their respective final or component time estimate for the participant, the variance factor being retained in association with the participant and applied by the processor to adjust a future final time estimate for the participant performing a subsequent aggregate task having similar characteristics as the aggregate task.

2. The method as defined in claim 1 wherein the at least one participant comprises only a single participant, the participant data being a participant profile for that participant, such that operating the processor to determine the final time estimate for completing the aggregate task comprises determining a final time estimate for that single participant to complete the aggregate task.

3. The method as defined in claim 1 further comprising: for each participant in the at least one participant, the participant data further comprises a plurality of participant-specific time variation factors on the computer-readable storage device comprising at least one of the following: a settling time factor, an idle time factor, a packing-up time factor, and a task-dependent time factor.

4. The method as defined in claim 1 further comprising: configuring the processor to receive an input value representing a media item category and to derive metadata attributes from the media item based on the input value, wherein:

if the input value indicates that the media item category is video, then the processor is configured to derive the difficulty level and a length variable based on the content information of the video;

if the input value indicates that the media item category is audio, then the processor is configured to derive the difficulty level and a length variable based on the content information of the audio;

if the input value indicates that the media item category is English text, then the processor is configured to derive the difficulty level based on the vocabulary in the text, and a length variable based on the word count of the text, wherein both the vocabulary and the word count are derived from the content information of the English text;

if the input value indicates that the media item category is mathematical text, then the processor is configured to derive the difficulty level based on the mathematical operators in the text, and a length variable based on the word count of the text, wherein both the mathematical operators and the word count are derived from the content information of the mathematical text;

if the input value indicates that the media item category is an English problem set, then the processor is configured to derive the difficulty level based on the vocabulary in the English problem set, and a length variable based on the total number of questions in the English problem set, wherein both the vocabulary and the total number of questions are derived from the content information of the English problem set;

if the input value indicates that the media item category is a mathematical problem set, then the processor is configured to derive the difficulty level based on the mathematical operators in the mathematical problem set, and a length variable based on the total number of questions in the mathematical problem set, wherein both the vocabulary and the total number of questions are derived from the content information of the mathematical problem set; and if the input value indicates that the media item category is hybrid, then the processor is configured to derive the difficulty level based on user input.

5. The method as defined in claim 1 further comprising:

operating the processor to determine a plurality of component time estimates, wherein each component time estimate in the plurality of the component time estimates is the time estimate for the participant to complete a component task in the aggregate task, each component time estimate being determined based on the media item category, the at least one corresponding metadata attribute for the corresponding component task, the participant data of the participant, and the historical time data of the participant or other participants in the at least one participant; and operating the processor to determine the final time estimate for the participant to complete the aggregate task based on the sum of the plurality of component time estimates and an additional average total time between the component tasks.

6. The method as defined in claim 5, wherein operating the processor to determine a component time estimate for the participant to complete a component task in the aggregate task further comprises operating the processor to:

determine the at least one corresponding item based on the component task;

for each corresponding item, determine the length variable, the difficulty level, and the media item category;
for each corresponding item, determine the average rate per media item(s) per difficulty level of the corresponding item based on the historical time data; and
determine the component time estimate by multiplying the length variable of the corresponding item with the average rate per media item(s) per difficulty level of the corresponding item.

7. The method as defined in claim 6, wherein operating the processor to determine a component time estimate for the participant to complete a component task in the aggregate task further comprises the steps of:
if the processor locates the participant data for the participant in the computer-readable storage device:
if the processor locates the media item category of the at least one corresponding item of the component task for the participant, operating the processor to determine the component time estimate based on the located media item category and the corresponding participant data; or
if the processor fails to locate the media item category of the at least one corresponding media item of the component task for the participant, operating the processor to determine the component time estimate based on available participant data relating to the other media item categories for the participant, or on user input; or
if the processor fails to locate the participant data for the participant in the computer-readable storage device, operating the processor to determine the component time estimate based on a class of alternative participant data, wherein the class of alternative participant data is determined from user input or available participant data of the other participants in the at least one participant in the computer-readable storage device, the other participants sharing at least one characteristic with the participant.

8. The method as defined in claim 7, wherein the at least one characteristic shared between the participant and the other participants is determined based on user input.

9. The method as defined in claim 1 further comprising:
the processor receiving a request to determine an estimated workload for the one participant; and in response to the request, operating the processor to determine an estimated workload for the participant based on the final time estimate for the participant to complete an aggregate task corresponding to the workload.

10. The method as defined in claim 9 further comprising:
the processor receiving a request to schedule an aggregate task for the participant; and
in response to the request, operating the processor to determine a schedule for the participant based on the estimated workload and calendar information of the participant.

11. The method as defined in claim 1 wherein the computer-readable storage device comprises a first computer-readable storage device for storing the plurality of media items, and a second computer-readable storage device for storing the participant data.

12. A system for providing automatic task time estimation and scheduling for electronic learning, the system comprising:
at least one computer-readable storage device configured to provide i) a plurality of media items, each media item comprising content information, each media item associated with a media item category, and ii) historical time data for at least one participant in a historical data module, wherein for each participant in the at least one participant, the historical time data comprises at least a plurality of historical completion time values, wherein each historical completion time value is stored in relation to a plurality of factors of a media item comprising an average rate per media item(s) per difficulty level of the media item for the each participant in the at least one participant, wherein the average rate per media item per difficulty level is determined using a correction factor based on a network or machine latency for the each participant in the at least one participant; and
at least one processor linked for communication with the at least one computer-readable storage device and configured to i) determine a plurality of corresponding metadata attributes for an aggregate task by, for each component task in the aggregate task, deriving at least one corresponding metadata attribute from the at least one corresponding item for that component task, the at least one corresponding metadata attribute comprising the difficulty level for a corresponding media item in the plurality of media items, ii) provide a time estimation module for determining a final time estimate for the participant to complete the aggregate task based on at least the plurality of corresponding metadata attributes for that aggregate task, participant data for the participant, and the historical time data for the participant or other participants in the at least one participant, wherein the time estimation module further comprises a set of machine-readable instructions configured to operate the processor to update the final time estimate for the participant to complete the aggregate task based on a numeric value representing a variance factor, wherein the numeric value representing the variance factor is determined based on the historical completion time values and their respective final or component time estimate for the participant, the variance factor being retained in association with the participant and applied by the processor to adjust a future final time estimate for the participant performing a subsequent aggregate task having similar characteristics as the aggregate task.

13. The system as defined in claim 12, wherein,
for each participant in the at least one participant, the participant data module is further configured to store participant data further comprising a plurality of participant-specific time variation factors on the computer-readable storage device, wherein the plurality of participant-specific time variation factors comprise at least one of the following: a settling time factor, an idle time factor, a packing-up time factor, and a task-dependent time factor.

14. The system as defined in claim 12, wherein the at least one processor is further configured to receive an input value representing a media item category and to derive metadata attributes from the media item based on the input value, wherein,
if the input value indicates that the media item category is video, then the processor is configured to derive the difficulty level and a length variable based on the content information of the video;
if the input value indicates that the media item category is audio, then the processor is configured to derive the difficulty level and a length variable based on the content information of the audio;

if the input value indicates that the media item category is English text, then the processor is configured to derive the difficulty level based on the vocabulary in the text, and a length variable based on the word count of the text, wherein both the vocabulary and the word count are derived from the content information of the English text;

if the input value indicates that the media item category is mathematical text, then the processor is configured to derive the difficulty level based on the mathematical operators in the text, and a length variable based on the word count of the text, wherein both the mathematical operators and the word count are derived from the content information of the mathematical text;

if the input value indicates that the media item category is English problem set, then the processor is configured to derive the difficulty level based on the vocabulary in the English problem set, and a length variable based on the total number of questions in the English problem set, wherein both the vocabulary and the total number of questions are derived from the content information of the English problem set;

if the input value indicates that the media item category is mathematical problem set, then the processor is configured to derive the difficulty level based on the mathematical operators in the mathematical problem set, and a length variable based on the total number of questions in the mathematical problem set, wherein both the vocabulary and the total number of questions are derived from the content information of the mathematical problem set; and if the input value indicates that the media item category is hybrid, then the processor is configured to derive the difficulty level based on user input.

15. The system as defined in claim 12, wherein the time estimation module configured to operate the at least one processor to determine a final time estimate for completing the aggregate task comprises:

a set of machine-readable instructions configured to operate the at least one processor to determine a plurality of component time estimates, wherein each component time estimate in the plurality of the component time estimates is the time estimate for the participant to complete a component task in the aggregate task, each component time estimate being determined based on the media item category, the at least one corresponding metadata attribute for the corresponding component task, the participant data of the participant, and the historical time data of the participant or other participants in the at least one participant; and another set of machine-readable instructions configure to operate the at least one processor to determine the final time estimate for the participant to complete the aggregate task based on the sum of the plurality of component times estimates and an additional average total time between the component tasks.

16. The system as defined in claim 15, wherein operating the at least one processor to determine a component time estimate for the participant to complete a component task in the aggregate task comprises a set of machine-readable instructions configured to:

determine the at least one corresponding item based on the component task;

for each corresponding item, determine the length variable, the difficulty level variable, and the media item category;

for each corresponding item, determine the average rate per media item(s) per difficulty level of the corresponding item based on the historical time data; and determine the component time estimate by multiplying the length variable of the corresponding item with the average rate per media item(s) per difficulty level of the corresponding item.

17. The system as defined in claim 16, wherein operating the at least one processor to further determine a component time estimate for a participant to complete a component task in the aggregate task further comprises a set of machine-readable instructions configured to:

if the processor locates the participant data of the participant in the computer-readable storage device:
  if the processor locates the media item category of the at least one corresponding item of the component task for the participant, operating the processor to determine the component time estimate based on the located media item category and the corresponding participant data; or
  if the processor fails to locate the media item category of the at least one corresponding media item of the component task for the participant, operating the processor to determine the component time estimate based on available participant data relating to the other media item categories for the participant, or on user input; or if the processor fails to locate the participant data of the participant in the computer-readable storage device, operating the processor to determine the component time estimate based on a class of alternative participant data, wherein the class of alternative participant data is determined from user input or available participant data of the other participants in the at least one participant in the computer-readable storage device, the other participants sharing at least one characteristic with the participant.

18. The system as defined in claim 17, wherein the at least one characteristic shared between the participant and the other participants is determined based on user input.

19. The system as defined in claim 12, further comprising a workload estimation module, the workload estimation module comprising a set of machine-readable instructions configured to: receive a request to determine an estimated workload for the participant; and in response to the request, operate the at least one processor to determine an estimated workload for the participant based on the final time estimate for the participant to complete an aggregate task corresponding to the workload.

20. The system as defined in claim 19, further comprising a scheduling module, the scheduling module comprising a set of machine-readable instructions configured to receive a request to schedule an aggregate task for the participant, and in response to the request to operate the at least one processor to determine a schedule for the participant based on the estimated workload and calendar information of the participant.

21. The system as defined in claim 12, wherein the at least one computer-readable storage device comprises a first computer-readable storage device for storing the plurality of media items, and a second computer-readable storage device for storing the participant data.

* * * * *